United States Patent [19]

van Ligten et al.

[11] 4,426,139
[45] Jan. 17, 1984

[54] PROGRESSIVE ADDITION LENS

[75] Inventors: Raoul F. van Ligten; Yeo K. Kee, both of Singapore, Singapore

[73] Assignee: Polycore Optical Pte. Ltd., Singapore, Singapore

[21] Appl. No.: 366,540

[22] Filed: Apr. 8, 1982

Related U.S. Application Data

[63] Continuation-in-part of Ser. No. 322,431, Nov. 18, 1981, abandoned.

[51] Int. Cl.³ .............................................. G02C 7/06
[52] U.S. Cl. .................................................... 351/169
[58] Field of Search ................................. 351/168–172

[56] References Cited

U.S. PATENT DOCUMENTS 4,362,368 12/1982 van Ligten ........................ 351/169

Primary Examiner—John K. Corbin
Assistant Examiner—Scott J. Sugarman
Attorney, Agent, or Firm—Robert G. Slick

[57] ABSTRACT

A progressive addition lens is provided having a wide transition corridor and an improved balance between astigmatism and distortion in the field of peripheral vision to provide a wide, distortion-free clear view. This is achieved by employing a cosine function in blending the transition corridor with the peripheral area.

6 Claims, 6 Drawing Figures

DISTANCE ZONE

PROGRESSIVE ZONE

READING ZONE

PROGRESSIVE ADDITION LENS

REFERENCE TO RELATED APPLICATION

This application is a continuation-in-part of our application Ser. No. 322,431 filed Nov. 18, 1981, now abandoned.

SUMMARY OF THE INVENTION

The prior art has shown progressive addition lenses characterized by mainly four areas. The distance portion of the lens, the reading portion, the transition corridor and the areas peripheral to the transition zone, i.e. at the sides of the transition corridor between the reading zone and the distance area. These zones are usually achieved by shaping one of the two surfaces of the lens. The convex surface is normally chosen for this, although the opposite surface of the spectacle lens can be chosen as well. In the description, it is assumed that the progressive addition correction is on the convex surface. The ophthalmic lens can either be a finished or a semi finished progressive addition lens.

A finished lens (either cut to fit a frame or uncut) has on the convex surface the shape that defines the progressive addition lens behavior. It has on the concave surface the shape governed by the cylindrical or spherical correction required to compensate these refractive aberrations of the wearer. On the convex side the surface refractive power causes in combination with the refractive power of the concave surface the required lens power to comply with the prescription of the wearer. The center thickness of the lens is dependent on the distance portion lens power and the lens power addition to reach the reading portion lens power. A minimum center thickness is required to give the lens sufficient mechanical strength.

Normally a lens of the present invention would be sold to a manufacturing optician as a semi finished ophthalmic lens, consisting of two surfaces. One surface (convex) would contain the refractive power typifying the progressive addition lens properties of the present invention and the other surface would be generally spherical (concave); the lens has a thickness in excess of that required for a finished progressive addition lens. This excess material permits the optician to grind and polish the concave surface to the refractive power to suit the wearer's prescription, resulting in a finished lens as described above.

Within the above four areas, the aberrations leading to influencing the visual acuity (mainly astigmatism) and the distortion aberration contribute to the quality of the lens. A certain state of balancing of these aberrations has led to lenses which either have too much distortion when good acuity is obtained, or relative low acuity when low distortion is achieved. Typically a lens with very low distortion and a distribution of astigmatism of rather high value in the distance portion has been described in U.S. Pat. No. 3,687,582 to Maitenaz. On the other hand, a lens with very low astigmatism in the distance portion and relatively high distortion in the periphery has been described in U.S. Pat. No. 4,056,311 to Winthrop. In both cases the usable width of the progression zone has been limited to cause a small width-of-field in this zone.

The object of this invention is to provide a symmetrical progressive addition lens with a substantially wider width of field in the progression zone, a substantially improved balance between astigmatism and distortion in the field of peripheral vision to render a clear distortion free, wide view when looking through the lens. This is achieved by a novel formulation of the progression corridor and a blending of the transition corridor with the peripheral area, using a cosine function.

DESCRIPTION OF THE PREFERRED EMBODIMENTS OF THE INVENTION

For purposes of explanation, the convex surface of the lens is chosen as the progressive addition surface.

Figure 1:
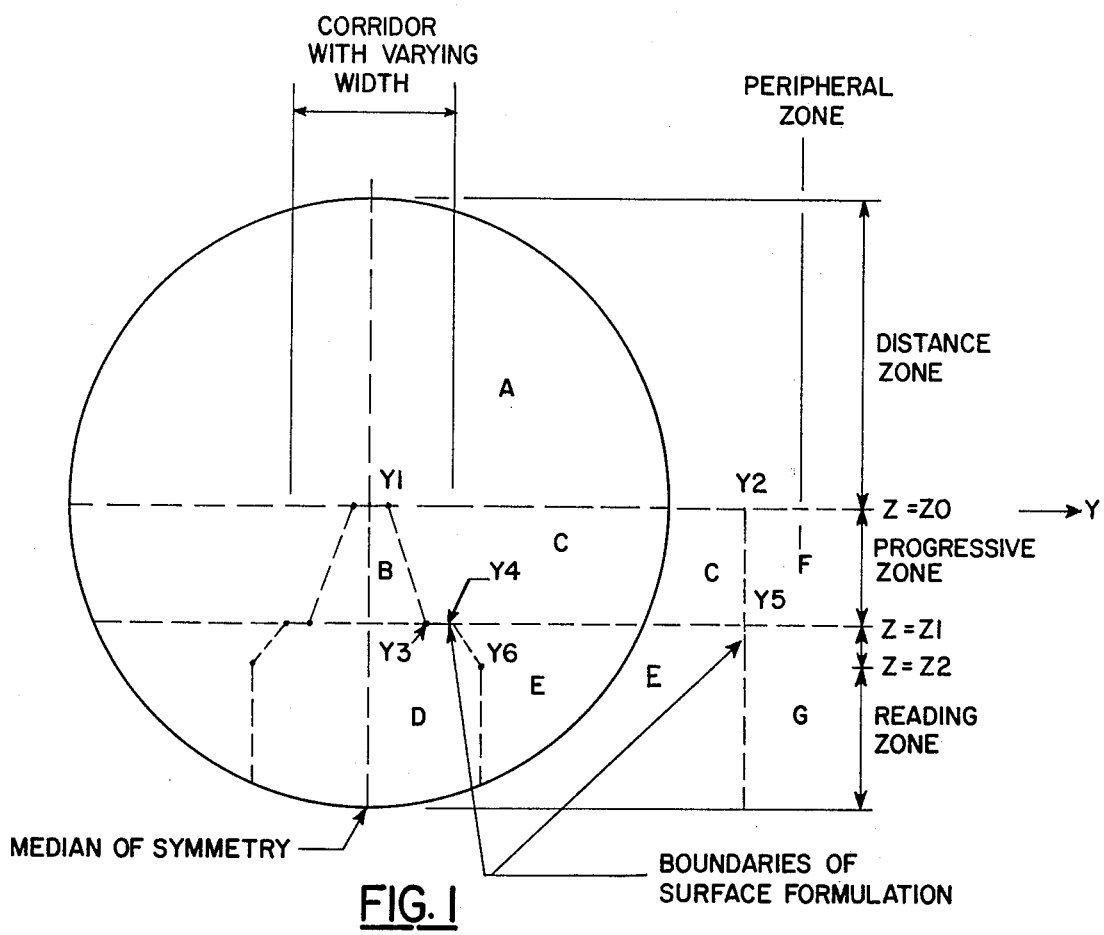
FIG. 1 is a front view of the surface from which a lens of the present invention is cut out showing the various zones referred to in the specification.

Referring now to FIG. 1, the zones are described as follows:
A: Distance zone
B: Progressive zone
C: Upper blending zone
D: Reading zone
E: Lower blending zone
F: Upper peripheral zone—outside C
G: Lower peripheral zone—outside E The new points of this invention are the formulation for zones B, C, E, F and G, and particularly B, C and E on the convex side of the lens.

Formulation in zone B, the central corridor:

$$X_2 = C[p(Z-3)^3 + qy^2(Z-3)^2 + ry^2(Z-3)] + \& + t$$

where
X is the coordinate perpendicular to the paper.
$\&$ = the formulation for the distance portion. This could be the formulation for a sphere, a hyperbola, a parabola or any formulation relevant to good distance vision.
C is a constant connected with the addition of power from the distance to the reading portion in diopters $= \text{add}/(324 \times 10^3)$
$0 < p \leq 14$
Z = coordinate Z
$q \geq 0$
y = coordinate y
$r \geq 8$ $t$ correction term to satisfy boundary conditions with distance portion $= -(t_2 + d_1 Z) + \dfrac{500}{A_1} - \sqrt{\dfrac{500}{A_1}^2 - y^2 - Z^2}$ $A_1 = (A_2)_{Z=0}^{y=0}$ $$A_2 = \dfrac{1000(n-1)}{2}\left[\dfrac{1}{p_1} + \dfrac{1}{p_2}\right]$$

$n$ = refractive index of lens material $$\frac{1}{\rho_1} = \frac{1}{2(1+d^2+e^2)^{3/2}}[(1+d^2)g + (1+e^2)f - 2deh +$$

$$\sqrt{\{(1+d^2)g + (1+e^2)f - 2deh\}^2 - 4(fg-h^2)(1+d^2+e^2)}\ ]$$

$$\frac{1}{\rho_2} = \frac{1}{2(1+d^2+e^2)^{3/2}}[(1+d^2)g + (1+e^2)f - 2deh -$$

$$\sqrt{\{(1+d^2)g + (1+e^2)f - 2deh\}^2 - 4(fg-h^2)(1+d^2+e^2)}\ ]$$

$$d_1 = \left(\frac{\partial t_1}{\partial Z}\right)_{\substack{y=0\\Z=0}}$$

$$t_2 = (t_1)_{\substack{y=0\\Z=0}}$$

$$d = \frac{\partial t_1}{\partial Z}$$

$$e = \frac{\partial t_1}{\partial y}$$

$$f = \frac{\partial^2 t_1}{\partial Z^2}$$

$$g = \frac{\partial^2 t_1}{\partial y^2}$$

$$h = \frac{\partial^2 t_1}{\partial Z \partial y}$$

$$t_1 = C[p(Z-3)^3 + qy^2(Z-3)^2 + ry^2(Z-3)]$$

The formulation in zone C:

$$X_2' = f_1 X_2 + f_2 X_2''$$

where
$X_2''$ = formulation in F
$X_2$ = formulation in central corridor B $$f_1 = \frac{1}{2}\left[1 + \cos\left(\pi \frac{y - y_a}{y_b - y_a}\right)\right]$$

For $Z_0 \leq Z \leq Z_1$ $$f_2 = \frac{1}{2}\left[1 + \cos\left(\pi \frac{y - y_b}{y_a - y_b}\right)\right]$$

The formulation in zone F:

$$X''_2 = \frac{M}{9} Z^3 + \frac{NZ^4}{12} + \& + V$$

M and N are coefficients chosen to optimize the distortion properties.
& = the same as before
V = is a correction term to further influence the distortion properties.
The formulation for zone D:
The equation for a sphere $$X_3 = X_R - \sqrt{R_R^2 - y^2 - (Z - Z_R)^2}$$

$X_R$ = X coordinate of the center of this sphere
$Z_R$ = Z coordinate of the center of this sphere
$R_R$ = radius of this sphere $X_R$ and $Z_R$ are chosen such that in the y=0 meridian the circular intersection of this sphere with this meridian is tangent with $(X_2)_y=0$ at $Z=Z_1$ The preferred embodiment of this invention is a case characterized by preferred constants, p, q, r, M, N, $y_1$, $y_2$, $y_3$, $y_4$, $y_5$, $y_6$, $Z_0$, $Z_1$, $Z_2$ and k. The constants C and $R_R$ are connected with the addition of power between the distance portion A and reading portion D. They are not typical for this invention but more for the different additions. The formulation & is not typical for the invention, but relates to the base curve of the distance portion, giving it a certain value. These base curves are standardized in the common lenses now available.

In case a sphere is chosen for the distance portion, the formulation for & is $$X_1 = R_D - \sqrt{R_D^2 - y^2 - Z^2}$$

Where $R_D$ is the radius of curvature of the distance portion surface (convex). This is the preferred embodiment for the distance portion. In the preferred embodiment the constants take the following values:

$p \cong 11$
$q \cong 1$
$r \cong 15$ $$M \cong \frac{1.22 \times \text{addition in progression corridor}}{\frac{n-1}{2} \times (Z_1 - Z_0) \times 1000}$$

$N \cong 0$
$y_1 \cong 2.1$ mm
$y_2 \cong 50$ mm
$y_3 \cong 4.2$ mm
$y_4 \cong 7$ mm
$y_5 \cong 50$ mm
$y_6 \cong 14.5$ mm
$Z_0 \cong 0$ mm
$Z_1 \cong 12$ mm
$Z_2 \cong 18$ mm
$k \cong 0$ The formulation for zone E:

$$X_3' = G_1 X_3 + G_2 X_3''$$

$X_3''$ = formulation for zone G $$\left.\begin{array}{l} G_1 = \frac{1}{2}\left[1 + \cos\left(\pi \frac{y - y_e}{y_d - y_e}\right)\right] \\ G_2 = \frac{1}{2}\left[1 + \cos\left(\pi \frac{y - y_d}{y_e - y_d}\right)\right] \end{array}\right\} \text{For } Z_1 < Z < Z_2$$

-continued $$G_1 = \tfrac{1}{2}\left[1 + \cos\left(\pi\frac{y - y_c}{y_d - y_c}\right)\right]$$
$$G_2 = \tfrac{1}{2}\left[1 + \cos\left(\pi\frac{y - y_d}{y_c - y_d}\right)\right]$$
For $Z \geq Z_2$ The formulation of zone G:

$$X_3'' = X_2'' + W$$

W = is a constant
The boundaries:
These are defined by the plane $Z = Z_0$ delineating the distance portion from the intermediate zone.
The plane $Z = Z_1$ defining the boundary between the intermediate zone and the near portion.
The plane perpendicular to the paper containing the line $$y_a = \frac{y_3 - y_1}{Z_1 - Z_0} Z + y_1$$

The plane $y_b = y_2$
The plane perpendicular to the paper containing the line $$y_c = y_6 + k(Z - Z_2)$$

The plane $y_d = y_5$
The plane perpendicular to the paper containing the line $$y_e = \frac{y_6 - y_4}{Z_2 - Z_1}(Z - Z_1) + y_4$$

All the powers are in diopters and lengths in mm.

$$\text{The factor } C = \frac{\text{add}}{324 \times 10^3}$$

the addition takes place between $Z=0$ and $Z=12$ and is expressed in diopters.
The blending formulation having the general form of $$\tfrac{1}{2}\left[1 + \cos\left(\pi\frac{y - y_a}{y_b - y_a}\right)\right]$$

results in distortion properties, best described as follows.

A horizontal line distorts into a cosine shaped line with a certain amplitude. The advantage of the cosine distortion is that closer to the eye's center of the field of view the distortion becomes rapidly small. As long as the amplitude of the distortion is kept within limits of human tolerance, the total field can be considered optimized. The cosine distortion adds to the optimization by insuring less distortion closer to the center of attention of the observer. This feature gives the wearer a feeling as if there were no distortion at all. This feature enhances the dynamic use of the lens.

In prior art lenses the distortions in the periphery are either a fanning of straight lines or by practically extending the distance portion into the periphery while making the blending zone very varrow and abrupt. The fanning leaves in the vicinity of the area of attention some distortion even though small. This distortion exceeds the distortion of a cosine blending. The extension of the distance portion into the periphery with an abrupt blending zone makes the blending zone very obvious at all times. The blending is further influenced by the choice of M, N, $y_a$, $y_b$, $y_c$, $y_d$ and $y_e$. When N=0 and M≠0 the blending in the far periphery causes distortions akin to that of a linear power law surface. When M=0 and N≠0, a quadratic power law governs the distortions in the far periphery.

Figure 2:
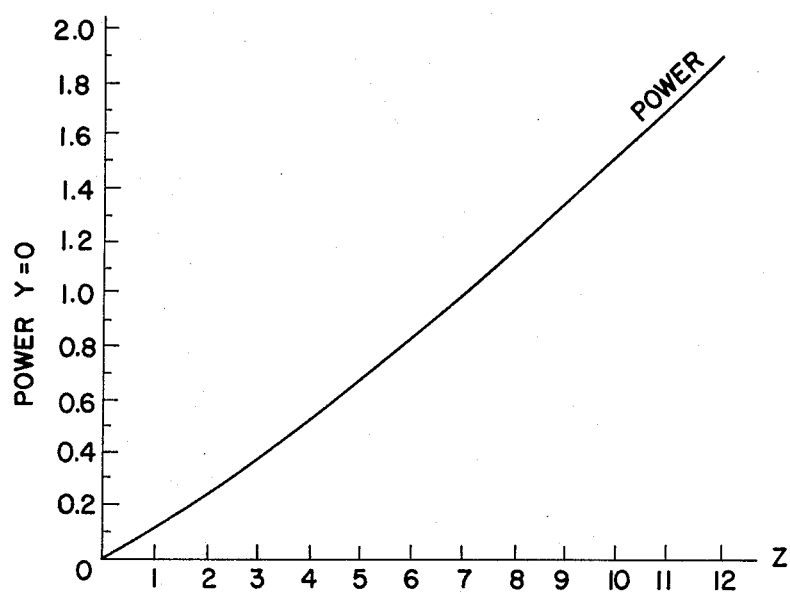
FIG. 2 is a graph of the calculated power law for a 2 addition lens.

In FIG. 2, the calculated power law for a 2 addition lens is shown.

Figure 3:
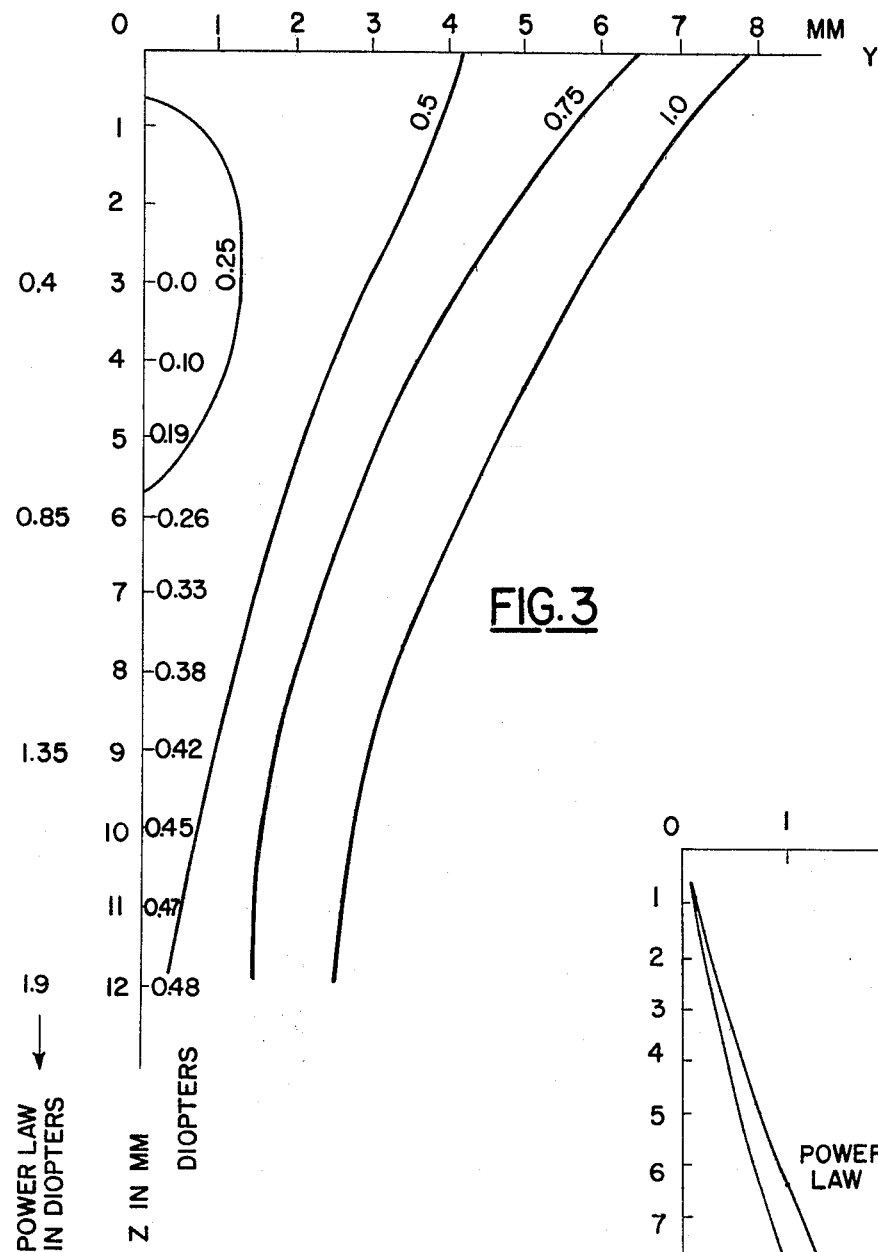
FIG. 3 is a graph of the calculated astigmatism of the progression zone of a lens of the present invention for a 2 addition.

In FIG. 3, the calculated astigmatism of the progression zone for a 2 addition lens is shown.

Figure 4:
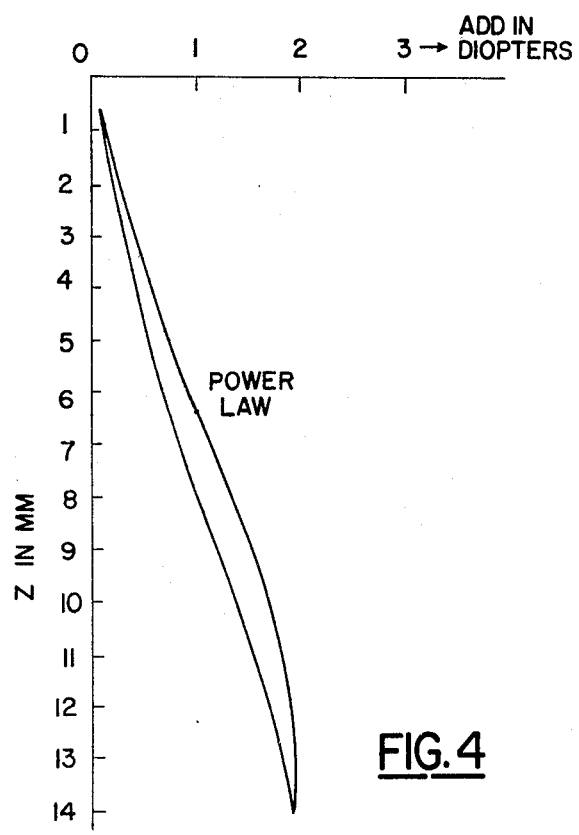
FIG. 4 is a graph of the measured values of the power law for 10 lenses having a 2 diopter addition.

In FIG. 4, the measured values of the power law is given for 10 lenses, having a 2 diopter addition.

Figure 5:
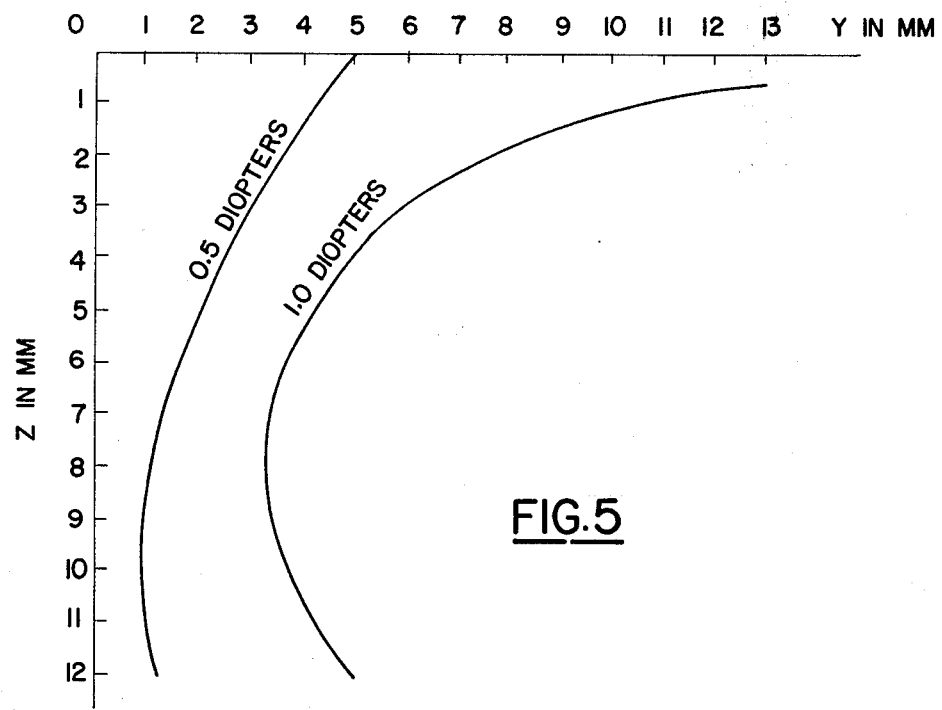
FIG. 5 is a graph of the measured astigmatism for the progression zone of 2 diopter lens.

In FIG. 5, the measured astigmatism for a 2 diopter addition lens' progression zone is given.

For the explanation of the invention, the convex lens surface was described as having the progressive addition properties. The same teaching applies for the concave surface, but in this case allowance should be made for some signs in the formulations, such that concave surfaces are expressed rather than convex.

Many variations can be made in the exact embodiments shown without departing from the spirit of this invention.

Figure 6:
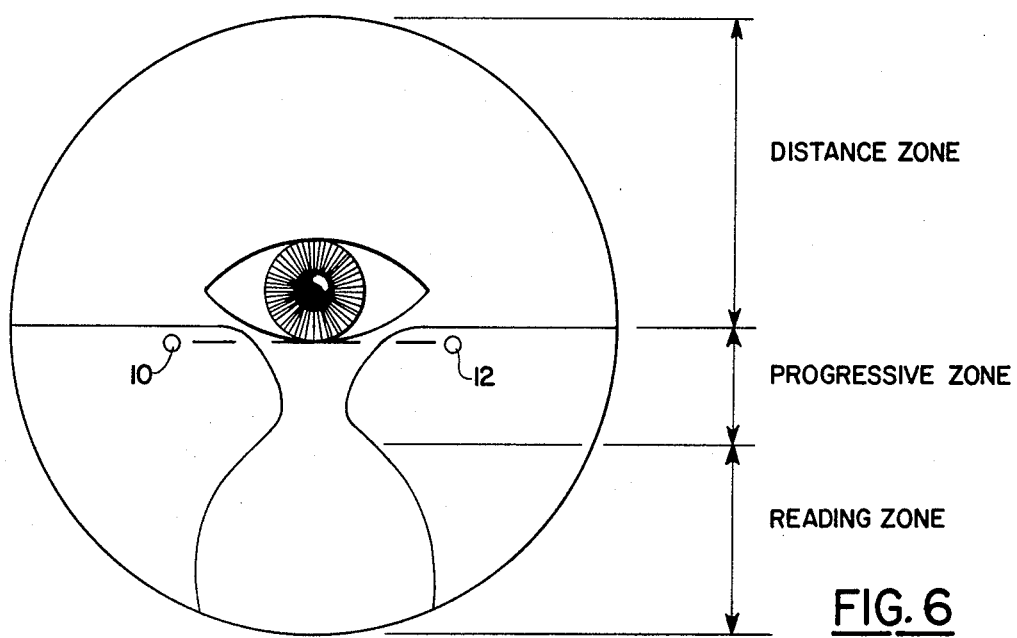
FIG. 6 is a front view of a lens showing some permanent marks thereon.

The state of the art lenses of the present invention may provide permanent marks on the progressive addition surface in order to enable the orientation of the progressive surface relative to the wearer's eyes. FIG. 6 shows the relative placement of typical permanent marks on the lens. Thus the marks 10 and 12 enable the practitioner to properly position lens relative to the wearer's eye.

The subject matter to be claimed is:
1. A progressive power lens having a distance portion at the top and a reading portion at the bottom connected by a central corridor wherein the power varies in said central corridor and merges smoothly into said distance and reading portions wherein said central corridor is defined by $X_2$ as the height measured from the reference plane (y, Z) in mm as follows:

$$X_2 = t_1 + \& + t$$

$$t_1 = C[p(Z-3)^3 + qy^2(Z-3)^2 + ry^2(Z-3)]$$

& = formulation of distance portion
t correction term to satisfy boundary conditions with $$\text{distance portion} = -(t_2 + d_1 Z) + \frac{500}{A_1} - \sqrt{\left(\frac{500}{A_1}\right)^2 - y^2 - Z^2}$$

$$t_2 = (t_1)_{Z=0}^{y=0}$$

$$d_1 = \left(\frac{\partial t_1}{\partial Z}\right)_{Z=0}^{y=0}$$

$$A_1 = (A_2)_{Z=0}^{y=0}$$

-continued $$A_2 = \frac{1000(n-1)}{2}\left[\frac{1}{\rho_1} + \frac{1}{\rho_2}\right]$$

n = refractive index of lens material
$\rho_1$ and $\rho_2$ are principal radii of the surface defined by $t_1$
y = coordinate of y
Z = coordinate of Z
C is a constant connected with the addition of power from the distance to the reading portion in diopters
$0 < p \leq 14$
$q \geq 0$
$r \geq 8$.

2. The lens of claim 1 wherein the values are as follows (all other values as in claim 1):

$$C = \frac{add}{324 \times 10^3}$$

add = the addition of power from the distance to the reading portion in diopters
$p \cong 11$
$q \cong 1$
$r \cong 15$ $$\& \cong R_D - \sqrt{R_D^2 - y^2 - Z^2}$$

$R_D$ = radius of the spherical surface in the distance portion.

3. A progressive power lens having a first blending zone on each side of a central corridor and horizontally spaced therefrom by a peripheral zone, said blending zone having the formula $X_2'$ is defined as the height measured from the reference plane (y, Z) in mm wherein $$X_2' = f_1 X_2 + f_2 X_2''$$

where
$X_2$ = formulation in central corridor in mm
$X_2''$ = formulation in peripheral zone in mm $$f_1 = \tfrac{1}{2}\left[1 + \cos\left(\pi\frac{y - y_a}{y_b - y_a}\right)\right]$$

For $Z_0 \leq Z \leq Z_1$ $$f_2 = \tfrac{1}{2}\left[1 + \cos\left(\pi\frac{y - y_b}{y_a - y_b}\right)\right]$$

y = coordinate y
Z = coordinate Z $$y_a = \frac{y_3 - y_1}{Z_1 - Z_0} Z + y_1$$

$y_b = y_2$
$0 \leq y_1 \leq 15$
$y_2 \geq 15$
$2 \leq y_3 \leq 30$
$-2 \leq Z_0 \leq 5$
$8 \leq Z_1 \leq 18$ $$X''_2 = \frac{M}{6} Z^3 + \frac{N}{12} Z^4 + \& + V$$

$$M = \frac{C_2 \times \text{addition in progression corridor}}{\frac{n-1}{2} \times (Z_1 - Z_0) \times 1000}$$

n = refractive index of lens material
$0 \leq C_2 \leq 5$
$N \geq 0$
& = formulation of distance portion
V is a correction term to further influence the distortion properties.

4. The lens of claim 3 wherein the values are as follows (all other values as in claim 3):
$y_1 \cong 2.1$
$y_2 \cong 50$
$y_3 \cong 4.2$
$Z_0 \cong 0$
$Z_1 \cong 12$
$C_2 \cong 1.22$
$N \cong 0$.

5. A progressive power lens having a second blending zone on each side of the reading portion and horizontally spaced therefrom by a peripheral zone, said second blending zone having the formula $X_3'$ is defined as the height measured from the reference plane (y, Z) in mm wherein $$X_3' = G_1 X_3 + G_2 X_3''$$

$X_3$ = formulation in reading portion in mm
$X_3''$ = formulation in peripheral zone in mm $$\left.\begin{array}{l} G_1 = \tfrac{1}{2}\left[1 + \cos\left(\pi\dfrac{y - y_e}{y_d - y_e}\right)\right] \\ G_2 = \tfrac{1}{2}\left[1 + \cos\left(\pi\dfrac{y - y_d}{y_e - y_d}\right)\right] \end{array}\right\} \text{For } Z_1 < Z < Z_2$$

$$\left.\begin{array}{l} G_1 = \tfrac{1}{2}\left[1 + \cos\left(\pi\dfrac{y - y_c}{y_d - y_c}\right)\right] \\ G_2 = \tfrac{1}{2}\left[1 + \cos\left(\pi\dfrac{y - y_d}{y_c - y_d}\right)\right] \end{array}\right\} \text{For } Z \geq Z_2$$

y = coordinate y
Z = coordinate Z
$y_c = y_6 + k(Z - Z_2)$
$y_d = y_5$ $$y_e = \frac{y_6 - y_4}{Z_2 - Z_1}(Z - Z_1) + y_4$$

$0 \leq k \leq 5$
$2 \leq y_4 \leq 30$
$y_5 \geq 15$
$y_6 \geq 2$
$8 \leq Z_1 \leq 18$
$Z_2 \geq 8$ $$X''_3 = \frac{M}{6} Z^3 + \frac{N}{12} Z^4 + V + \& + W$$

-continued
$$M = \frac{C_2 \times \text{addition in progression corridor}}{\frac{n-1}{2} \times (Z_1 - Z_0) \times 1000}$$

n = refractive index of lens material
$-2 \leq Z_0 \leq 5$
$0 \leq C_2 \leq 5$
$N \geq 0$
& = formulation of distance portion
V is a correction term to further influence the distortion properties W = constant.

6. The lens of claim 5 wherein the values are as follows (all other values as in claim 5):
$k \cong 0$
$y_4 \cong 7$
$y_5 \cong 50$
$y_6 \cong 14.5$
$Z_1 \cong 12$
$Z_2 \cong 18$
$C_2 \cong 1.22$
$Z_0 \cong 0$
$N \cong 0$.

* * * * *